Aug. 29, 1967  R. C. KLEIN  3,338,131
APPARATUS FOR SELECTIVELY SUPERIMPOSING PROJECTED IMAGES
Filed Oct. 12, 1965  4 Sheets-Sheet 1
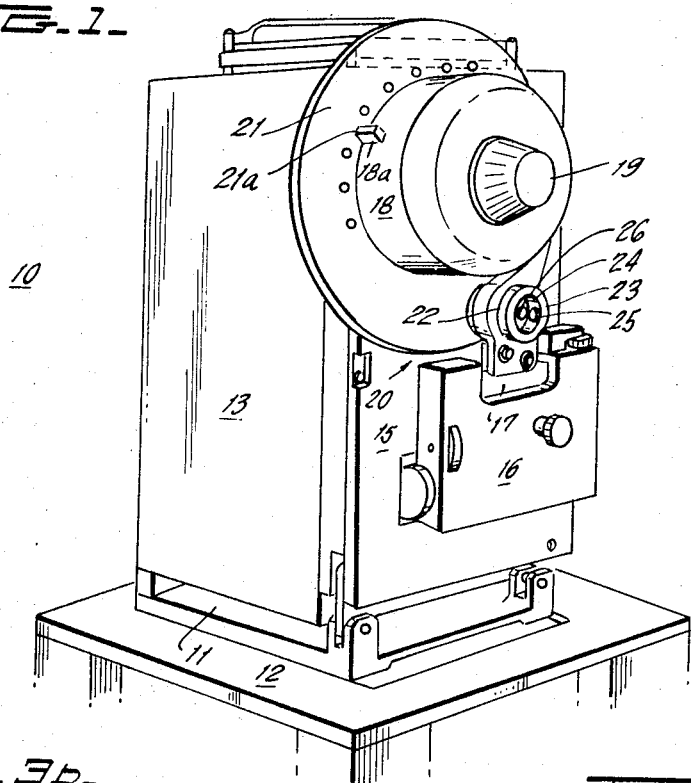
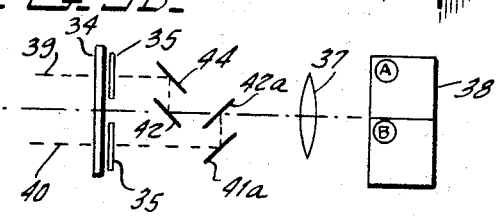
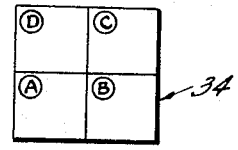
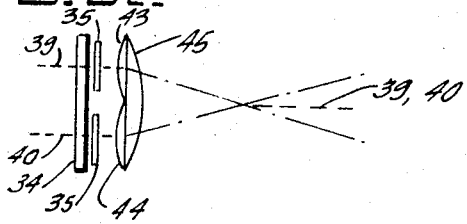
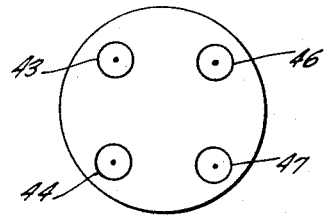
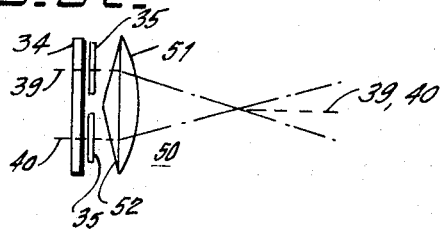
INVENTOR.
ROBERT C. KLEIN
BY
OSTROLENK, FABER, GERB & SOFFEN
ATTORNEYS

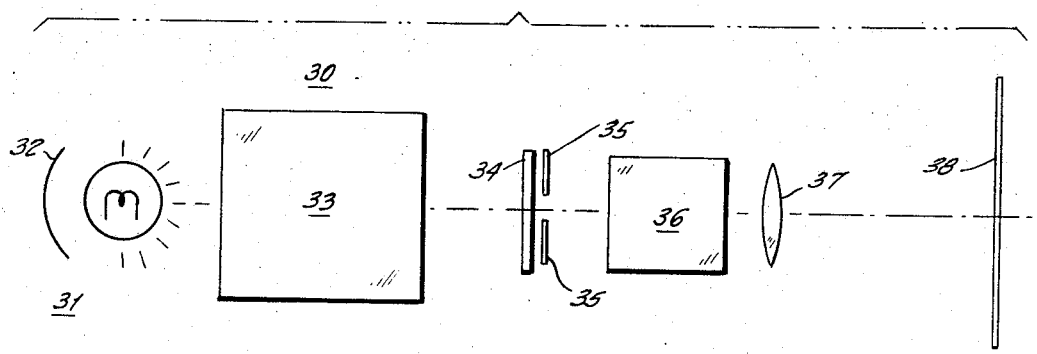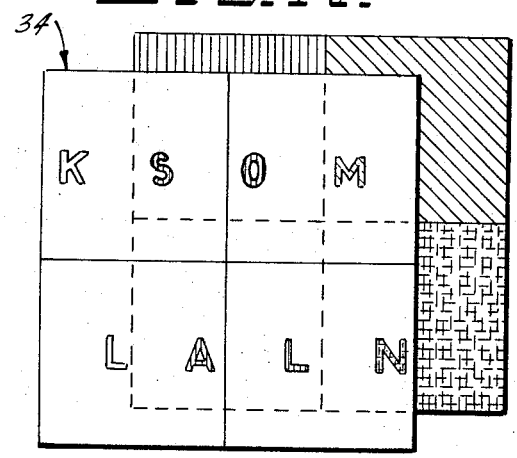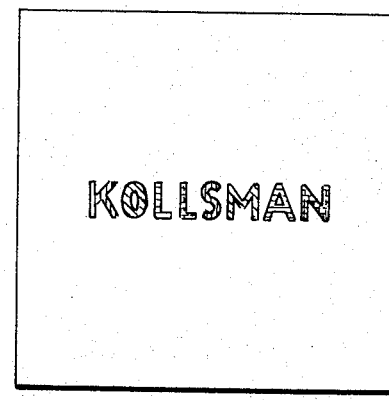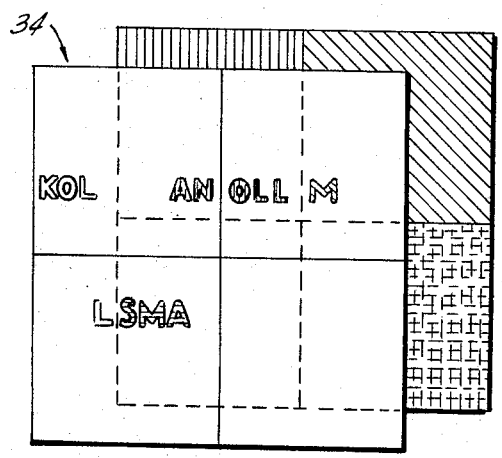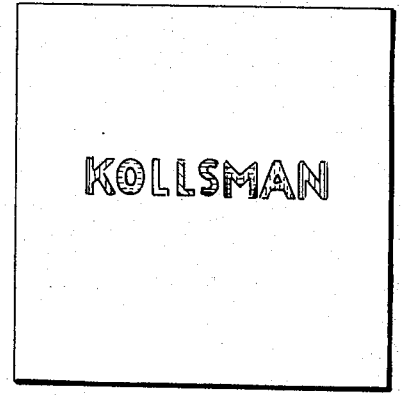

Aug. 29, 1967
R. C. KLEIN
3,338,131
APPARATUS FOR SELECTIVELY SUPERIMPOSING PROJECTED IMAGES
Filed Oct. 12, 1965
4 Sheets-Sheet 3
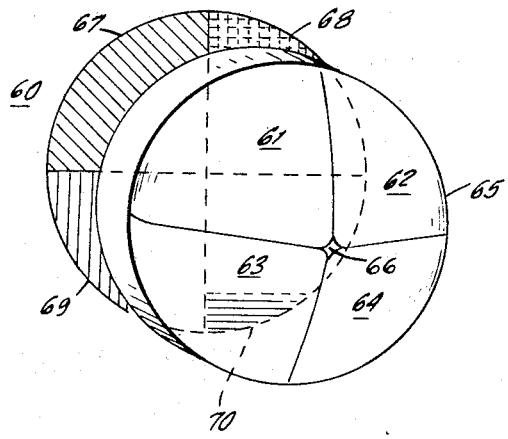
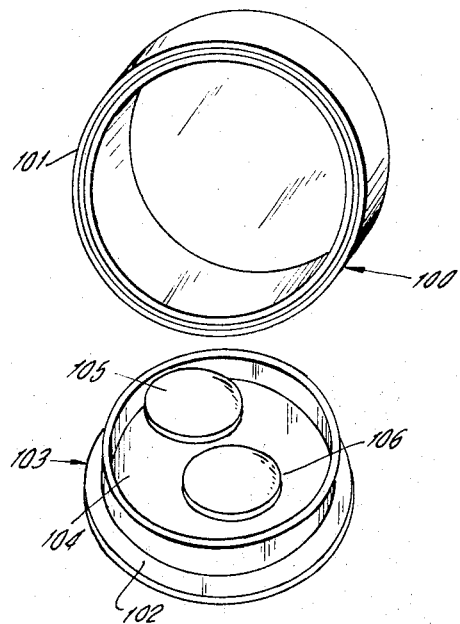
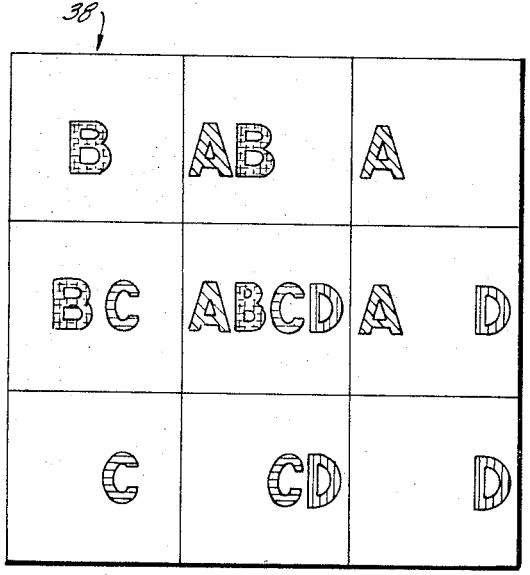
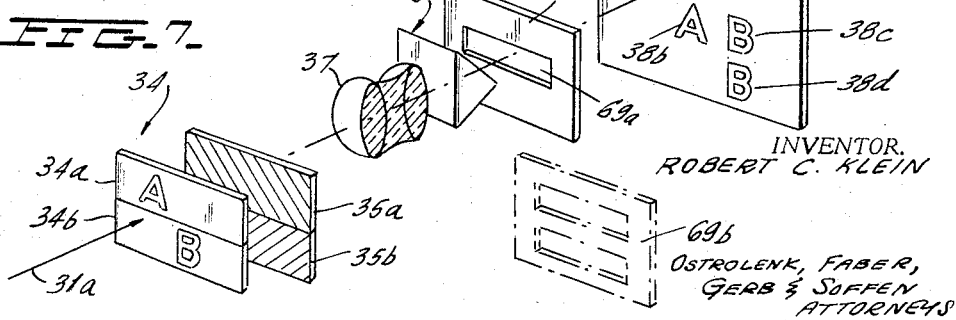
INVENTOR.
ROBERT C. KLEIN
OSTROLENK, FABER,
GERB & SOFFEN
ATTORNEYS

INVENTOR.
ROBERT C. KLEIN
BY
OSTROLENK, FABER, GERB & SOFFEN
ATTORNEYS

United States Patent Office 3,338,131
Patented Aug. 29, 1967

3,338,131
APPARATUS FOR SELECTIVELY SUPERIMPOSING PROJECTED IMAGES
Robert C. Klein, Plainview, N.Y., assignor to Kollsman Instrument Corporation, Elmhurst, N.Y., a corporation of New York
Filed Oct. 12, 1965, Ser. No. 495,293
12 Claims. (Cl. 88—24)

ABSTRACT OF THE DISCLOSURE

This application teaches a lens system capable of superimposing images taken from different sectors of a slide or other similar medium and superimposing the images upon a central region of the viewing surface or screen.

In one preferred embodiment the system is provided with a light source and condensing optics for focusing the light upon the data medium (i.e., glass slide) so that the focused light rays pass through all sectors of the data medium. An objective lens causes the light rays passing through all sectors of the data medium to be focused upon the viewing screen. Positioned adjacent the objective lens are a plurality of collecting lenses one for each sector provided in the data medium which collect the light rays from their associated sectors and refract or bend the light rays so as to superimpose the images in each sector upon a central portion of the viewing screen. Each of the sectors may be provided with different types of data with the superposition of the images greatly facilitating the analysis of all data upon a single region on the viewing screen.

In another preferred embodiment the objective lens is provided with a plurality of wedges, one for each sector in the data medium, each of which causes the light rays from each sector to be defracted so as to appear in a central region of the viewing screen and further defracts light rays from the remaining sectors so as to position them in a variety of predetermined locations about the central region of the viewing screen with the number of discrete locations on the viewing screen being equal to the number of sectors provided in the data medium.

As another preferred embodiment, the optical system described above may be employed in a data projector system wherein each sector is comprised of an area upon a transparent medium having an opaque coating which is etched or otherwise removed by a scribing stylus so as form an image trajectory or other pattern in each sector. Whereas each of the sectors may be scribed individually, the novel lens system causes all of the sectors to be superimposed upon a central viewing region and to be positioned at locations surrounding the central viewing region. By provision of suitable masking means any one of the various regions upon the viewing screen may be viewed while all other regions are masked out to permit analysis of any one of the individual images to the exclusion of the others of a plurality of the images or of all of the images simultaneously, depending upon the position of the masking means.

The instant invention relates to projection systems and more particularly to a novel lens system for use in data projectors and the like which provides a single projector with the capability of superimposing and/or portraying a plurality of sectors of pictorial information which are arranged in a non-superimposed manner on a transparency or other projection source.

There are numerous application where it is desired to present pictorial information from a variety of independent sources upon a single viewing screen for comparative evaluation or other observational purposes. One specific, but by no means limiting application of this principle is that of displaying a plurality of trajectories of unidentified flying objects upon a viewing screen which may have a map as background material or upon which a map may also be projected to relate such trajectories to that region of the earth's surface which the monitoring facility is concerned.

To present such data with the highest degree of illumination efficiency it is well known to prepare the slide containing the trajectory by scribing or scratching the trajectory upon a slide member having an opaque coating. Thus, the opaque material removed during the scribing process appears as a white line upon a dark screen. By projecting pictorial data in this manner it is possible and actually quite desirable to present pictorial data projected from a plurality of independent projectors upon a single viewing screen since simultaneous viewing of all the independent trajectories has decided advantages and further since overlapping trajectories will not "wash out" one another as would be the case where each trajectory was projected as a dark line upon a white background.

Although simultaneous projection of this pictorial information has inherent advantages, the positioning of each of the independent projectors relative to one another and to the viewing screen is critical. In cases where large numbers of projectors are arranged in vertical, horizontal, or vertical and horizonal arrays, the pictorial information emitted from the projectors displaced from an imaginary line connecting the center of the projector array with the center of the screen, will be distorted unless specifically designed optics are used to compensate for this "off axis" condition. Even such optics have limitations so that the permissible displacement of projectors, from the center line described above, is limited. Consequently, it is highly desirable, from a technical, as well as from an economic point of view, to minimize the number of projectors required to present certain data.

The instant invention contemplates the use of a novel optical system for superimposing pictorial data from a number of independent sources upon a single viewing screen and through the use of a single projector.

One preferred embodiment of the instant invention is comprised of projectors having a conventional light source and condensing lens arrangement for focusing the light upon a slide member which contains pictorial information in a plurality of distinct sectors upon the slide member. The slide member may be a transparency, a film strip, a glass slide or any other similar medium. The light which is concentrated upon the medium having pictorial data passes through the medium and then through an optical system which is designed to diffract the pictorial data arranged in different sectors upon the transparency and substantially superimpose this pictorial data upon one specific sector of a viewing screen. The optical system is preferably provided with a plurality of color filters of differeing colors or dichroics with each of the filters substantially aligned with and in close proximity to each of the sectors of pictorial data contained in the transparency so that there is one color filter for each of the transparency sectors.

The color filters tint or color the light passing through the transparency. The optical superimposition system operates on the rays from the separate information areas so that the center of each area will be projected upon the center of the viewing screen when projected through an objective lens forming part of the optical system and whose function it is to focus the image plane upon the objective plane. In this manner each individual sector of pictorial data will be located substantially in the central region of the viewing screen with data from each information area appearing in shades of the color of its respective filter.

The optical system provided for obtaining the superimposition effect may employ a beam-splitter arrangement; a plurality of collecting lenses with each of said collecting lenses being associated with a sector of the transparency; or may employ optical wedges associated with each of the pictorial data sectors, with all of the three schemes being further provided with objective lens means for the purpose of focusing the image plane upon the objective plane.

The alternative embodiment employing optical wedges, together with objective lens means is capable of providing the additional features of presenting the pictorial data of each sector upon a plurality of sectors of the viewing screen with the total number of viewing areas projected upon the viewing screen being a function of the optical wedges employed and the number of pictorial sectors present in the transparency. The arrangement of pictorial data upon the transparency may be such as to provide a plurality of superimposed images of the differing sectors upon the viewing screen so that a variety of different comparisons may be observed by the viewers. For example, in the case where the transparency is provided with four sectors A, B, C and D of substantially equal areas and the optical system is provided with an equal number of optical wedges, each of the sectors of the transparency will appear in four distinct locations upon the viewing screen. The central sector or location of the viewing screen will have all of the sectors A, B, C, D of the transparency superimposed upon one another. In addition thereto, four sectors of the viewing screen will contain only the pictorial data of transparency sectors A, B, C and D and the remaining sectors of the viewing screen will have transparency sectors C, B; A, B; C, D; and A, D superimposed upon one another. This arrangement thereby permits on a single viewing screen the transparency sectors A, B, C and D to be viewed independently of the other sectors, permits a comparison of A versus B, A versus D, C versus B, C versus D; as well as a comparison of A, B, C and D all superimposed upon the central sector, all of which combinations provide analysis of pictorial data in a manner which was heretofore never possible through the use of such a relatively simple optical system.

The novel optical system of the instant invention may also be used to great advantage in data projector systems such as those described in detail in Patent No. 3,151,927, issued Oct. 6, 1964; Patent No. 3,160,462, issued Dec. 8, 1964; Patent No. 3,160,461, issued Dec. 8, 1964; copending application Serial No. 194,901, filed May 15, 1962, now Patent No. 3,230,543, and Serial No. 465,070, filed June 18, 1965, now Patent No. 3,247,518. Basically such data projector systems are comprised of a scribing stylus movable in mutually perpendicular directions within a substantially vertically aligned plane for the purpose of scribing or scratching an opaque composition from a slide member to enter a trajectory or other pictorial data upon the slide member for the purpose of projecting this data upon a viewing screen. The scribing stylus may be either fully automatically and electronically, or semi-automatically controlled to enter the data upon the slide member. By operating the scribing stylus control means so as to enter data into a plurality of discrete sectors upon the slide member, this arrangement when employed with the optical system of the instant invention permits the material scribed upon the slide member to be superimposed upon the viewing screen in the same manner as previously described. An alternative arrangement to the single scribing stylus may be constituted of four scribing stylii all driven simultaneously by the scribing stylii control means with each stylii having its solenoid means for selectively engaging the slide member with one or more of the plural scribing styli, each of which is associated with a different sector of the slide member.

While certain preferred embodiments of the instant invention have been described above, it should be understood that the novel optical system described herein is useful in a variety of applications such as, for example, command and control systems, management displays, educational displays, training aids, simulators and any other types of applications where it is desired to superimpose data from a plurality of sectors with the use of only a single projector.

It is, therefore, one object of the instant invention to provide a novel projector for use in observing projected data upon a viewing screen.

Another object of the instant invention is to provide a novel optical system for use in pictorial data projectors and the like for superimposing data from a plurality of differing sources upon one central area of a viewing screen.

Still another object of the instant invention is to provide a novel optical system for use in data projectors and the like which is capable of superimposing data provided on a plurality of independent sectors of the transparency or other data medium upon one central area of a viewing screen.

Another object of the instant invention is to provide a novel optical system for use in data projectors and the like which is capable of superimposing data provided on a plurality of independent sectors of the transparency or other data medium upon one central area of a viewing screen wherein further means are provided to project each of the sectors from the data medium in a different color.

Still another object of the instant invention is to provide a novel optical system for use in data projectors and the like which is capable of superimposing data provided on a plurality of independent sectors of the transparency or other data medium upon one central area of a viewing screen wherein further means are provided for projecting each of the sectors of pictorial data appearing in the data medium in a different degree of polarization.

Still another object of the instant invention is to provide a novel optical system for use in data projectors and the like which is comprised of a plurality of optical wedges and an objective lens means for projecting each of the pictorial data sectors appearing upon a data medium in a plurality of distinct sectors upon the viewing screen.

Still another object of the instant invention is to provied a novel optical system for use in projectors and the like which is capable of superimposing pictorial data present upon separate sectors of a data medium and superimposing the data from the independent sectors with varying degrees of polarization so as to form a three-dimensional picture upon the viewing screen.

Still another object of the instant invention is to provide a novel optical system for data projectors and the like which is capable of superimposing images from a plurality of sectors of a data medium upon a viewing screen with each medium being projected in a differing color so as to form various combinations of colors from the superimposed images.

These and other objects of the instant invention will become apparent when reading the accompanying description and drawings in which:

FIGURE 1 is a perspective view showing a data projector employing one of the optical systems of the instant invention.

FIGURE 2 is a schematic diagram showing the overall system diagram of a data projector, including the optical system of the instant invention.

FIGURE 3a is a plan view showing a pictorial data medium which may be employed in the system of the instant invention.

FIGURES 3b–3e show different alternative embodiments of the optical system of the instant invention.

FIGURE 4a shows a data medium having information contained within its four sectors.

FIGURE 4b shows a viewing screen and the manner in which the data from transparency 4a would be presented thereon.

FIGURES 5a and 5b show a data medium and viewing screen similar to those shown in FIGURES 4a and 4b, respectively.

FIGURE 6a shows a perspective view of one preferred embodiment of the instant invention.

FIGURE 6b is a perspective view showing an alternative embodiment of the instant invention.

FIGURE 7 shows a two sector optical system similar to that shown in FIGURE 3e and the four sector configuration of FIGURE 6a and the manner in which it presents material upon a viewing screen.

FIGURE 8 shows the manner in which data is presented upon a viewing screen when employing the optical system of FIGURE 6a.

Figure 9A:
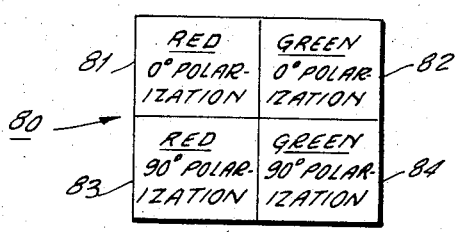
FIGURES 9a and 9b show alternative arrangements for data media which may be used to project pictorial data with the optical system of the instant invention.

Referring now to the drawings, FIGURE 1 shows a data projector substantially of the type described in the previously mentioned U.S. patents, all of which have been assigned to the assignee of the instant invention. The data projector 10 is comprised of a base member 11 which may rest on a suitable support 12. The rear portion of base 11 has positioned thereupon a housing 13 which houses the stylus and stylus driving means which generates the plot to be projected and light source and associated condensing optics. A detailed description of the stylus and stylus driving means is fully set forth in previously mentioned U.S. Patent No. 3,151,927 and will be omitted herein for purposes of brevity. A front plate 15 has pivotally mounted thereto a removable plate 16 which is provided with a mount 17 which positions and supports the novel optical system 20 of the instant invention and which is employed to project sharp superimposed images which have been traced upon the slide member, upon the data projector screen (not shown). The upper portion of data projector 10 is provided with a cup-shaped member 18 which is secured to data projector 10 by a removably mounted knob 19 so as to permit removal of the annular slide member 21. As is fully described in copending application, Serial No. 465,070, the slide member is a substantially annular transpart member, preferably formed of glass, which is coated upon the unexposed surface relative to the view of FIGURE 1 with a suitable opaque coating composition, which material is removed or scribed away by a scribing stylus contained within data projector housing 13 and which operation is described in detail in the previously mentioned U.S. patents and applications.

The opaque coated slide member 21 is provided with a notch 21a which is keyed to a projection 18a provided on cup-shaped member 18. Suitable detent means (not shown) which are fully described in U.S. Patent No. 3,151,927 operates to rotate cup-shaped member 18 through discrete angles of rotation so as to step slide member 21 about its central axis in order to move unscribed areas of the slide member into alignment with the optical system 20 which is substantially in alignment with the scribing stylus in the manner shown in FIGURE 2, as will be more fully described. The optical system 20, as shown in FIGURE 1, is comprised of a lens support 22 for mounting the lens system 23 which is comprised of an objective lens 24 and first and second collecting lenses 25 and 26, respectively. The arrangement of FIGURE 1 is designed to be employed with data media having two distinct data sectors, which arrangements will be more fully described. Suitable color filters, which will be more fully described and shown in subsequent figures, cooperate with the collective lenses so as to project the data from the separate sectors in differing colors.

Turning now to a consideration of FIGURE 2, the overall projection system 30 is comprised of a suitable light source 31 which may, for example, be a xenon-mercury light source to provide light of suitable intensity. A suitable reflector system 32 may be provided for the purpose of directing light in substantially the right-hand direction where the condensing optics 33 focuses the light upon the data media 34 which may, for example, be a transparency, film or glass member. The transparency, film, glass or other medium 34 is separated into more than one pictorial data sector in a manner to be more fully described. A plurality of color filters 35 are positioned between the condensing optics 33 and transparency 34 or the transparency 34 and the optical superimposition system 36, depending upon what is most practical in the particular system. Each of the color filters 35 substantially cover an associated individual pictorial data sector. Data presented in each data sector will be black and white or intermediate gray tones. The light source 31 emits light which is collected by the condensing optic system 33 and projected through the transparency 34. The color filters, which are preferably of differing colors, tint the light passing through the transparency. Each of the individual projections of differing colors lies on a different axis all of which are directed through the optical superimposition system 36. The optical superimposition system operates on the light rays from the separate information sectors so that the center of each sector of the transparency will appear substantially in the center of the viewing screen 38. When projected through the objective lens 37, which is designed to focus the image plane upon the objective plane each individual information area will cover the viewing screen and the pictorial data from each information area will thus appear in the color of its respective filter.

FIGURES 3a–3e show details of some of the superimposition systems. FIGURE 3a illustrates one possible manner of arranging a transparency (film, glass, et cetera) 34 which is separated into four symmetrical and equal areas A–D, respectively. In operation each of the areas A–D is equivalent to the full screen projection. The optical superimposition system 36 is so designed as to bend or refract the light rays of each of the independent sectors A–D so as to superimpose them substantially in the central region of the viewing screen to provide a single composite pictorial representation derived from the four pictorial data sectors.

FIGURE 3b shows one form which a superimposition system for two sectors A and B may assume. As is shown therein the light rays such as, for example, the light rays 39 and 40 which may, for example, be passing through sectors A and D of transparency 34, also pass through the color filters 35. Light ray 39, after passing through transparency 34 and its associated color filter 35 is deflected by a mirror 44 deflecting the light ray vertically downward. This light ray then impinges upon the surface of a beam-splitter 42, the upper surface of which is designed to reflect light and the under surface of which is designed to pass light. Since beam 39 impinges upon the reflector surface it is again deflected so that it now assumes a horizontal alignment and passes through objective lens 37 which focuses the image appearing in sector A (for example) upon the viewing screen. The light ray 39 also passes through the beam-splitter 42a, the upper surface of which passes the beam and the lower surface of which is a reflective surface. Considering the light ray 40, this passes through sector D, for example, of transparency 34 and color filter 35 to be reflected in the upper vertical direction by mirror 41a. The light ray 40 is then reflected again in the horizontal direction as it impinges upon the reflective surface, that is the under surface of beam splitter 42a. In this manner two sectors of a transparency may be superimposed upon one another at the viewing screen so as to form a single composite pictorial display in substantially the central region of the viewing screen and which is comprised of the two independent sectors.

Considering the alternative embodiment of FIGURES 3c and 3d, this lens system is comprised of a plurality of small collecting lens such as, for example, the collecting lenses 43 and 44 which collect the light rays 39 and 40 from their associated sectors of the transparency such that the light rays are refracted or bent by means of a modifier lens 45, which may or may not be the objective lens proper, for the purpose of superimposing the light rays as they leave the lens system of FIGURE 3c so as to form the superimposed projected image upon the viewing screen (not shown).

FIGURE 3d shows a lens system of the type shown in FIGURE 3c wherein four such collecting lenses 43, 44, 46 and 47 are mounted upon the modifier lens 45.

FIGURE 3e shows another alternative embodiment 50 of the instant invention which is comprised of a plurality of optical wedges such as the wedges 51 and 52, each of which wedges are associated with a specific sector of the data medium or transparency.

The optical system of the instant invention can be used in a variety of ways. Considering, for example, the transparency of FIGURE 4a and the viewing screen of FIGURE 4b, the sectors A–D may each contain incomplete portions of information in a manner shown in FIGURE 4a. Each of the sectors A–D is distinguished from one another by the colors red, green, blue and yellow, respectively, by providing filters of these colors which substantially cover each of the sectors so as to tint light passing through each sector by the appropriate color. The optical systems of FIGURES 3d or 3e will superimpose the pictorial data appearing on the transparency 34 so as to produce a composite image which utilizes the incomplete bits of information from each of the sectors to form a comprehensible composite image on viewing screen 38, as is shown in FIGURE 4b. Color filters of the colors red, green, blue and yellow are associated with the sectors A, B, C and D, respectively, so as to tint the pictorial data of each of these sectors with the color of their associated filter. The information is so positioned upon each of the sectors A–D in such a manner that, with the knowledge of the diffraction capabilities of the optical system employed the data will be interleaved so as to form a comprehensible word on the viewing screen 38, as shown in FIGURE 4b, with the letters of the word being of differing colors in the manner as shown.

Turning to a consideration of FIGURES 5a and 5b it is shown therein that the sectors A through D may be provided with either no information or with redundant information so that, when the pictorial data of each of the sectors is superimposed the colors of the respective filters will be mixed to form new colors. For example, the letter M which occurs in sectors B and C is so positioned in sectors B and C that these two images will be exactly superimposed upon one another with the green and blue colored superimposed images mixing to form an image of the letter M in yellow on the viewing screen 38. In the example of FIGURE 5a, only three of the sectors A through C are employed using only three color filters of the primary colors. As another example, the letter A which appears in sectors A and C are superimposed upon one another with the red and blue colors mixing to form an image of the letter A in magenta. While the examples of FIGURES 4a–5b show the mixing of letters to form words the transparencies may be provided with individual words to form phrases or sentences as well as being provided with any other forms of pictorial data. For example, the sector A might be provided with a picture of the North American continent while sectors B, C and D might be provided with trajectories of spacecraft or other moving objects passing over the continent. It should be understood that all of the above applications are merely exemplary and any desired forms of pictorial data may be portrayed whenever it is desired to superimpose data from different sectors of a data medium upon one viewing screen through the use of a single data projector.

FIGURE 6a shows an optical system 60 of the optical wedge type previously described with reference to FIGURE 3e. The optical system 60 is comprised of four optical wedges 61–64, respectively, each forming a quadrant of the composite lens arrangement with the exposed surfaces being tapered inwardly from the periphery 65 of the lens system toward the center point 66. The rearward surface of the lens system is provided with an objective lens 51 (see FIG. 3e) for focusing the image plane of the projector system upon the objective plane. While the optical system 60 of FIGURE 6a is shown as having four wedges arranged one in each of the four quadrants, it should be understood that any number of wedges may be employed within certain practical limits. For example, the optical arrangement of FIGURE 6a may be comprised of two, three, four or theoretically an infinite number of individual wedges each occupying an equal angular pie-shaped portion of the substantially circular shaped lens with there being a one-to-one relationship between pictorial data medium sectors and optical wedges or prisms. The actual number used in current applications is four. Only space and accuracy considerations limit the number of sectors which can be used.

Each of the optical wedge quadrants 61–64 has a color filter 67–70 associated therewith with each of the color filters being of differing colors.

In addition to superimposing all of the pictorial data of each of the sectors of the data medium substantially in the central portion of the viewing screen, the optical system 60 has another unique feature, namely that of portraying data from each of the sectors of the data medium in a plurality of different discrete regions upon the viewing screen with the number of images from each data sector projected upon the viewing screen being a function of the number of optical wedges of the optical system 60. As one specific example, consider the optical arrangement of FIGURE 7. As shown therein the transparency 34 is divided into two sectors 34a and 34b. Light rays 31a from a suitable light source (not shown) pass through the transparency and the color filters 35a and 35b which may, for example, be red and green, respectively, and objective lens 37. Positioned in front of objective lens 37 is the optical superimposition system 36 which is comprised of an optical wedge or prism of generally triangular shape which is of the appropriate configuration in the case where the transparency is divided into only two equal sectors. This optic system projects the pictorial data from sector 34a in two discrete locations 38a and 38b on viewing screen 38 and projects the image from sector 34d in the discrete regions 38c and 38d, respectively, of viewing screen 38. Thus observation of the viewing screen 38 when using the optical system of FIGURE 7 permits the pictorial data of sectors 34a and 34b to be observed independently of one another (as per areas 38a and 38d) and further permits these images to be observed simultaneously with one another for comparative purposes (as per the regions 38b and 38c). If desired it is possible to put suitable light blocking means such as a small plate or other device 69 having an opening 69a of the appropriate configuration as to block out or prevent selective ones of the images projected toward viewing screen 38 from reaching the viewing screen. Thus it is possible by vertical manipulation of the blocking plate 69 to prevent the images 38a and 38d from reaching the viewing screen so that the pictorial data from sectors 34a and 34b will be substantially superimposed upon the central viewing region. Other vertical manipulation will likewise permit either one of the individual non-overlapping images 38a and 38d from being viewed upon the screen while the remaining images will be blocked from being projected upon the viewing screen. By using a blocking member of still a different shape such as, for example, a plate of the configuration of 69b, it is possible to block out images 38b and 38c to view images 38a and 38d.

FIGURE 8 shows the pattern of images obtained in the case where the data medium transparency has four sectors A–D, as shown in FIGURES 3a and where the color filters and optical design of FIGURE 6 is employed as the system optics. Assuming that the data medium sectors contain pictorial data comprised of the alphabetic letters identifying their sectors, i.e., A, B, C, D, respectively, the resultant images projected upon the viewing screen 38 are as shown in FIGURE 8. The system optics 60 of FIGURE 6a acts upon the light rays in such a manner as to form a composite superimposed image in the central region or sector 74 of viewing screen 38. Considering the sector A which projects the alphabetic letter A upon the viewing screen, it can be seen that this image will be projected in the sectors 72, 73, 75 and 76 of viewing screen 38. In a like manner, the image of sector B will project the alphabetic letter B simultaneously into the sectors 71, 72, 74 and 75 of viewing screen 38. These arrangements provide rather unique observational and comparative capabilities allowing, for example, the easy and ready comparison of the pictorial data of sector A with sector B and sector D and sector C with sectors B and D, as well as allowing for an observation of sector A independently of all the other sectors. Other similar comparisons can be made with regard to the remaining sectors. As can readily be appreciated from the pattern on the viewing screen 38 of FIGURE 8 in the same manner as previously described with reference to FIGURE 7, suitable blocking plate means may be employed for the purpose of blocking out selective ones of the sectors or areas 71–79 of viewing screen 38, if desired.

In addition to the use of color filters other methods may be employed to distinguish the independent sectors of the transparency data medium. For example, FIGURE 9a shows a color filter arrangement 80 which is comprised of red and green filters 81 and 82 having 0° polarization (i.e., the light is plane polarized with the plane of polarization making an angle of 0° with a reference plane) and is further comprised of red and green filters 83 and 84 having 90° polarization (i.e., the light is plane polarized with the plane of polarization making an angle of 90° with a reference plane) with the filter arrangement 80 being used for a projector system in which the transparency is provided with four independent sectors divided into four equal quadrants. The resulting image projected upon the viewing screen may be viewed with polarized glasses such that the color filter scheme of FIGURE 9a may be employed to great advantage in providing a three-dimensional effect of the composite image projected upon the screen.

Figure 9B:
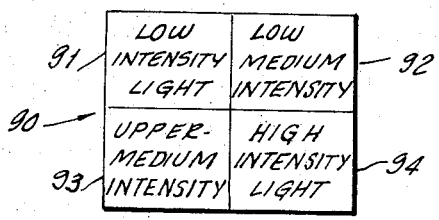

FIGURE 9b shows still another filter assembly 90 for use with a projector system in which the transparency is divided into four equal quadrants of independent pictorial information. Instead of being of a specific color, the filters 91–94 may all be of a single color or substantially transparent (i.e., white) and be shaded so as to attenuate the light passing therethrough by differing degrees with the amount of light attenuation going from high to low in moving through filters 91–94, respectively. For example, filter 94 would be substantially transparent and totally unshaded so as to form an image upon the viewing screen of high intensity light; filter 93 is just slightly shaded so as to form an image upon the screen of upper medium intensity; and filters 92 and 91 form images upon the viewing screen of lower medium and low intensity light, respectively.

Figure 10:
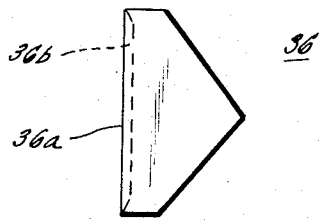
FIGURE 10 is an end view showing a manner in which the optical system of FIGURE 6a may be modified to correct for distortion.

In the case where the prism optics arrangement is employed it is desirable that the prism be designed to correct for distortion. One manner of providing this is shown in FIGURE 10 wherein a prissm of the type employed for projector systems having two sector transparencies the rearward surface which is normally flat, as shown at 36a, may be ground along its back surface 36a to form a curved back face 36b shown by the dotted line to correct for any distortion. It should be understood that other corrective measures may be employed such as the employment of a correction lens and thereby leading to a complex multi-lens system which is designed to provide for all corrections due to distortion or other causes.

FIGURE 6b is a perspective view showing the optical system of FIGURES 1 and 3c in greater detail. As can clearly be seen, this arrangement 100 is comprised of a cylindrical lens holding member 101 arranged to be slidably received by the support member 20 of FIGURE 1 and which is designed to threadedly engage a retaining ring 102 which acts to retain the lens 103 in its proper position. The lens 103 is comprised of an objective lens 104 having first and second collective lenses 105 and 106 mounted thereon. The color or other type filters may be mounted directly upon the under surface of objective lens 104 or between the engaging surfaces of objective lens 104 and the collective lenses 105 and 106, respectively. In a like manner the color filters of FIGURE 6a, namely the color filters 67–70, may likewise be mounted directly upon the rear surface of the prism member 60.

Figure 11:
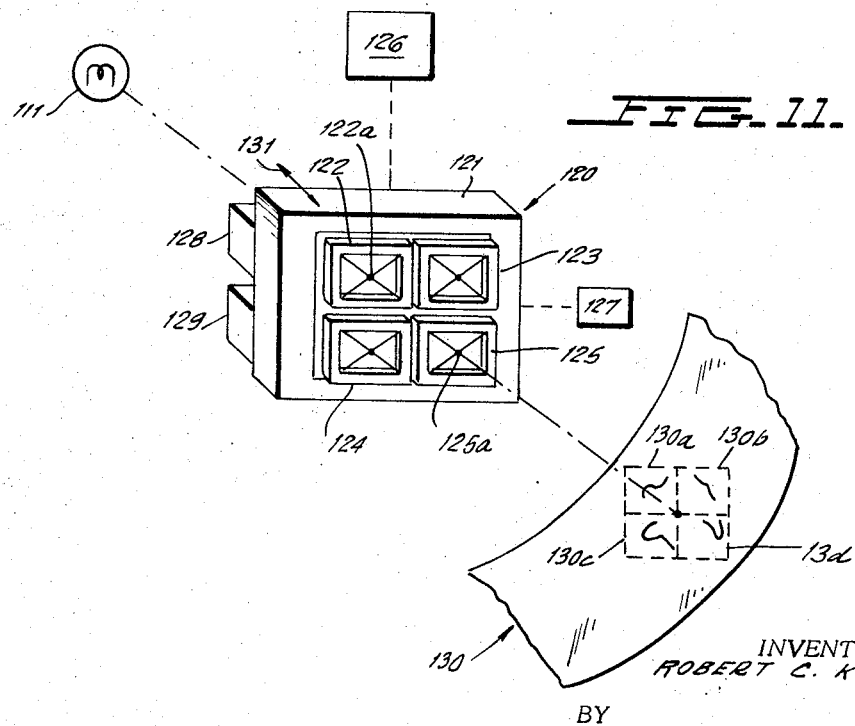
FIGURE 11 is a perspective view showing one arrangement for simultaneous sector scribing an opaque coated slide member of the type employed in the data projector of FIGURE 1.

FIGURE 11 shows an exploded view of a data projector scribing stylus arrangement which may be emplofed with the superimposition optics of the instant invention. Basically the arrangement shown therein is comprised of a suitable light source 111 for passing light through the scribing stylus assembly 120 which is designed to trace or scribe data into four discrete sectors 130a–130d of annular slide member 130, only one portion of which has been shown for purposes of clarity, it being understood that this slide member is substantially identical to that shown in FIGURE 1 and designated by the numeral 21. The stylus assembly 120 is comprised of a substantially rectangular shaped frame 121 in which a plurality of quadrant frames 122–125, respectively, are mounted. Each of the frames is provided with a scribing stylus 122a through 125a which is designed to scribe or scratch away the opaque material on slide member 130. While the frame 121 is restrained from moving out of the vertical plane in which it is aligned it is free to move in mutual perpendicular directions within this plane under the control of a vertical drive means 126 and a horizontal drive means 127. These drive means may be the servo operated tape drive means described in great detail in the above mentioned U.S. patents; the description of these drive means will be omitted since they lend no novelty to the device of the instant invention. It is sufficient, however, to understand that any suitable means may be provided for moving the frame 121 so as to trace out pictorial data in a two-dimensional surface.

It can clearly be seen that each of the individual frames 122–125 moves simultaneously with the carrying frame 121. Each of the frames is provided with a solenoid operated device such as the solenoid operated devices 128 and 129 for moving frames 122 and 124, respectively, in the direction shown by arrow 131. Thus it is possible to move the stylus member from only one of the four frames into engagement with its associated quadrant of the annular slide member while the other three stylus members are maintained a spaced distance away from their associated quadrants on slide member 130. In a like manner, it is possible to cause all four frames 122–125 to have their stylus members 122a–125a, respectively, moved into engagement with their associated quadrants on slide member 130. Thus, through the use of a single stylus drive arrangement comprised of the vertical and horizontal drive means 126 and 127, respectively, it is possible to trace the images shown in each of the quadrants 130a–130d upon slide member 130. By simultaneously putting two or more styli in plotting position, very high relative accuracy can be achieved between similar traces in the different sectors. As an alternative arrangement, the four individual stylus frames may be replaced by a single stylus frame with its stylus member being programmed to move to the quadrant of the slide member in which it is desired to scribe out the image and then to cause the image to be scribed out. The advantage of this arrangement is that it does not require three additional stylus supporting frames and three additional solenoid operated actuated members, but requires only one frame for mounting a single stylus member and one solenoid actuated member for moving the stylus of the frame into and out of engagement with the opaque composition of the annular slide member.

As can clearly be noted from the previous descriptions, the arrangement of FIGURE 11 can be incorporated with one of the optical systems as shown in FIGURES 3b–3e so as to superimpose the images in each of the slide member quadrants 130a–130d upon one central viewing area of a viewing screen.

It can be seen from the foregoing that the instant invention provides a novel optical system for use in data projecting systems and the like wherein pictorial data presented in different quadrants of a data medium such as a transparency or slide member may be superimposed upon one another in a central region of a viewing screen, this function being performed through the use of only a single projector and which heretofore required a plurality of such projectors for the performance of such a function.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. An optical system for use in projectors comprised of a light source; a flat planar medium having a plurality of discrete sectors containing data to be displayed; a viewing surface; means for directing the light rays emanating from said light source through at least two sectors of said medium and upon the viewing surface; the optical system being comprised of means positioned between the medium and the viewing surface for superimposing the data of each discrete sector upon one region of said viewing surface.

2. The optical system of claim 1, further comprising a plurality of filter means each being associated with one sector of said medium; each of said filters being of differing colors to project the data from their associated sectors in a distinctive color.

3. The optical system of claim 1, further comprising a plurality of filter means each being associated with one sector of said medium; each of said filters being capable of differing polarizing light at different polarization angles relative to a reference plane to project the data from their associated sectors in a distinctive polarization.

4. The system of claim 1, wherein said medium is a transparency.

5. The system of claim 1, wherein said medium is a transparent slide member having an opaque coating portion which may be removed in each of said sectors to form the pictorial data to be displayed.

6. The system of claim 5, further comprising movable stylus means for scribing the slide member.

7. The system of claim 1, wherein said optical system is comprised of reflecting means for bending the light rays passing through each sector of said medium to form a composite image in one discrete region of the viewing surface where the images of each sector are superimposed upon one another.

8. The system of claim 7, wherein certain of said reflecting means are comprised of beam splitting means for reflecting light impinging upon one surface and passing light rays impinging upon its opposite surface through the beam splitting means substantially undeflected.

9. The system of claim 1, wherein said optical system is comprised of a plurality of optical wedges equal in number to the number of sectors in said medium and with each of said wedges being substantially in alignment with an associated sector; said wedges being aligned relative to one another to produce a composite image upon one region of said viewing screen which composite image is comprised of the superimposed images of each medium sector.

10. The system of claim 9, and further comprising means to produce a plurality of images of the pictorial data of each sector in a plurality of discrete areas upon said viewing screen, with the number of plural images of a sector being equal to the number of wedges employed in said optical system.

11. The system of claim 1, wherein said optical system is comprised of a plurality of collective lenses equal in number to the number of sectors in said medium, each of said collective lenses being substantially in alignment with an associated sector; objective lens means for focussing the pictorial data of the medium sectors upon the viewing surface.

12. The system of claim 6, wherein said stylus means is comprised of a plurality of individual stylus assemblies; means for simultaneously moving all of said assemblies in two mutually perpendicular directions substantially in a plane; solenoid operated actuating means for selectively moving certain of said stylus assemblies into engagement with said slide member.

References Cited

UNITED STATES PATENTS

| | | | |
|---|---|---|---|
| 1,764,966 | 6/1930 | Mazer | 33—32 |
| 1,970,930 | 8/1934 | Brasseur et al. | 33—32 |
| 2,765,704 | 10/1956 | Mottu | 88—24 |
| 3,166,974 | 1/1965 | Cote et al. | 88—24 |
| 3,230,543 | 1/1966 | Morgenstern | 346—77 |

NORTON ANSHER, *Primary Examiner.*

W. M. FRYE, *Assistant Examiner.*